United States Patent
Boehlke

(10) Patent No.: US 11,152,011 B2
(45) Date of Patent: Oct. 19, 2021

(54) VOICE DETECTION WITH MULTI-CHANNEL INTERFERENCE CANCELLATION

(71) Applicant: Summit Wireless Technologies, Inc., Beaverton, OR (US)

(72) Inventor: Kenneth A. Boehlke, Portland, OR (US)

(73) Assignee: Summit Wireless Technologies, Inc., Beaverton, OR (US)

( * ) Notice: Subject to any disclaimer, the term of this patent is extended or adjusted under 35 U.S.C. 154(b) by 57 days.

(21) Appl. No.: 16/698,354

(22) Filed: Nov. 27, 2019

(65) Prior Publication Data
US 2021/0158830 A1    May 27, 2021

(51) Int. Cl.
*G10L 21/0216*    (2013.01)
*H04R 3/12*    (2006.01)
*G10L 21/0272*    (2013.01)

(52) U.S. Cl.
CPC ...... *G10L 21/0216* (2013.01); *G10L 21/0272* (2013.01); *H04R 3/12* (2013.01); *G10L 2021/02166* (2013.01)

(58) Field of Classification Search
CPC ............ G10L 21/0216; G10L 21/0272; G10L 2021/02166; G10L 21/0208; G10L 15/22; G10L 2021/02082; G10L 2015/223; H04R 3/12; H04M 9/082
See application file for complete search history.

(56) References Cited

U.S. PATENT DOCUMENTS

| 2005/0179540 A1* | 8/2005 | Rubenstein ............. G10L 15/22 340/539.18 |
| 2014/0003635 A1* | 1/2014 | Mohammad ........... G10K 11/16 381/306 |
| 2017/0070822 A1* | 3/2017 | Skovenborg ........... H04R 3/005 |

* cited by examiner

*Primary Examiner* — Yogeshkumar Patel
(74) *Attorney, Agent, or Firm* — Chernoff Vilhauer LLP

(57) ABSTRACT

A multichannel audio system with a plurality of multichannel speakers having microphones, where the system receives audio signals from multichannel speakers, an adaptive filter enhances the voice signal portion of the audio signal by canceling interference in the audio signals by eliminating the portion of the audio signal matching reference signals, and processing the voice signal into voice commands.

5 Claims, 3 Drawing Sheets

Multi-Channel Speaker Interference Cancellation

Single Channel Speaker Interference Cancellation

Multi-Channel Speaker Interference Cancellation

Multicast Speaker Packet Stream

VOICE DETECTION WITH MULTI-CHANNEL INTERFERENCE CANCELLATION

BACKGROUND OF THE INVENTION

In modern wireless speaker applications, voice commands are used to select audio content and adjust audio settings. These systems contain a microphone for receiving voice as well as a speaker driver for playing audio content. In order to recognize voice commands while audio is being played, these systems use a filter to remove the received audio content from the microphone signal before it is processed into commands. This removal increases the clarity of the voice signal. This prior art system is shown in FIG. 1.

SUMMARY OF THE INVENTION

Disclosed herein is a multichannel audio system with a plurality of multichannel speakers having microphones, where the system receives audio signals from multichannel speakers, an adaptive filter enhances the voice signal portion of the audio signal by canceling interference in the audio signals by eliminating the portion of the audio signal matching reference signals, and processing the voice signal into voice commands.

The foregoing and other objectives, features, and advantages of the invention will be more readily understood upon consideration of the following detailed description of the invention taken in conjunction with the accompanying drawings.

DETAILED DESCRIPTION OF PREFERRED EMBODIMENTS

In one embodiment of the multi-channel speaker interference cancellation system and method, the audio content is received by a receiving device via a microphone which picks up both ambient audio content and the user's voice. This audio content is amplified and driven into the voice coil of a speaker. The speaker's audio output interferes with the user's voice and needs to be removed before the Voice Output can be processed into Voice Commands.

This interference is removed by use of an Adaptive Filter(s) which receives Reference Signals from the speaker(s), where the reference signals are nearly identical to the speaker's signals as received by the microphone. The Adaptive Filter's subtracting of the reference signals from the microphone's output cancels the interference and generates a Voice Output with greater clarity.

Figure 1:
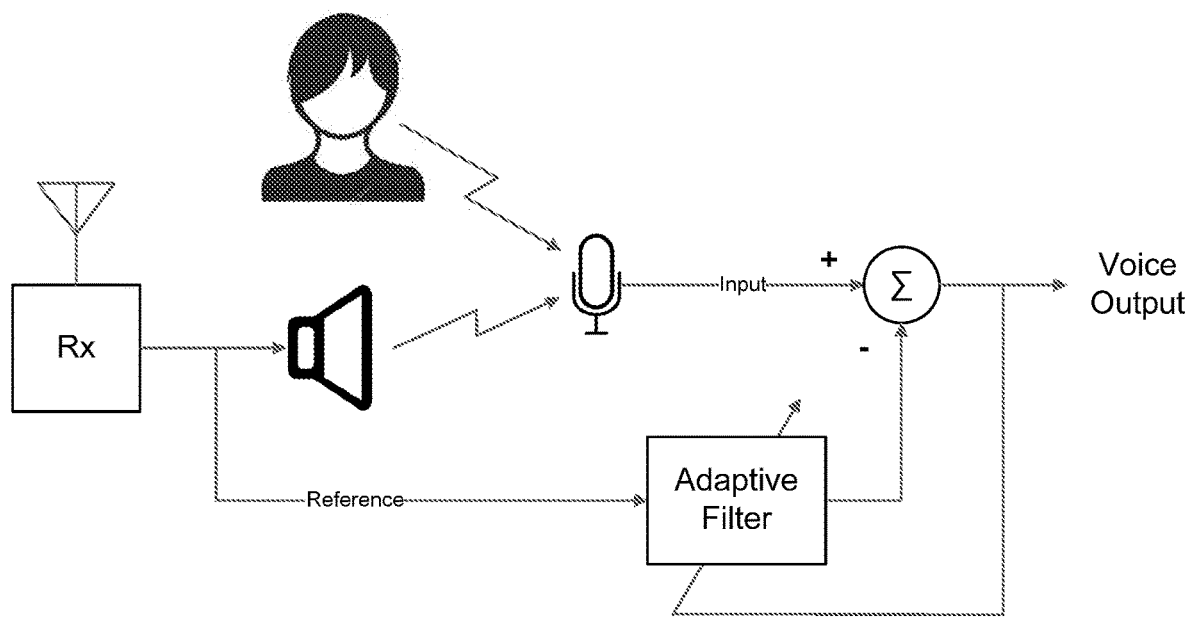
FIG. 1 is a schematic a single-channel speaker interference cancellation of the prior art.
2.
Figure 2:
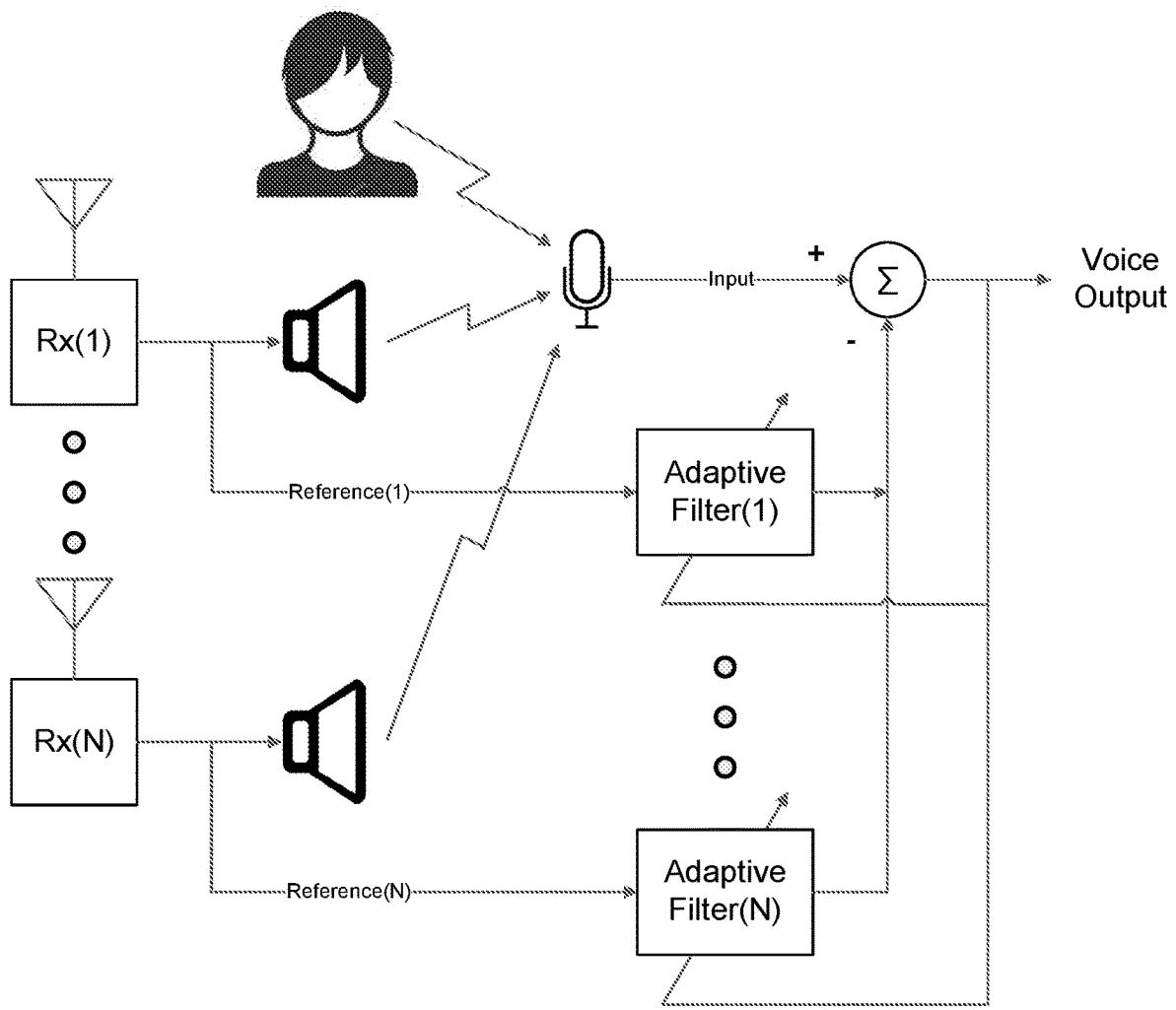
FIG. 2 is a schematic of a multi-channel speaker interference cancellation system.
3.

In a Multi-Channel audio system, the interference from all of the speakers must be cancelled. This Multi-channel interference cancellation is shown in FIG. 2.

In this embodiment of the Multi-Channel audio system, all the speakers are located in the same room (or zone). As a consequence, each of the N speaker's audio output interferes with the microphone on each speaker. Each source of inference must be removed from each microphone signal by providing a reference signal from every speaker to all the speakers.

Figure 3:
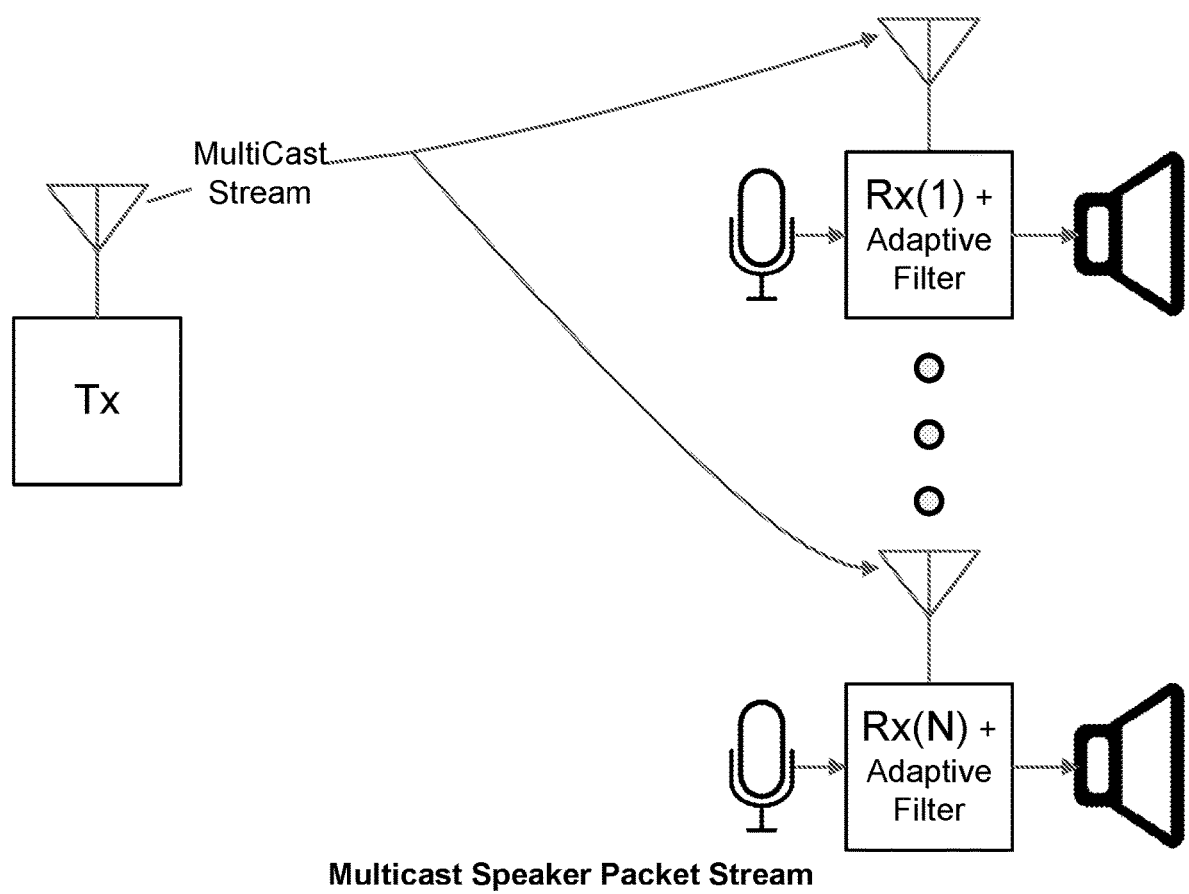
FIG. 3 is a schematic of a multicast speaker packet stream.

Sending the audio content in Multicast packets from the audio transmitting source provides all the speakers with all the information that is required for the full interference cancellation and is shown in FIG. 3.

Sending one Multicast packet to all the speakers is more efficient than sending Unicast packets to all the speakers and lowers the network loading by a factor of N. If these packets were sent Unicast, a packet containing all the speaker data would have to be sent to each speaker, increasing the network loading over Multicast by the number of the speakers involved.

This illustrates the advantages of a wireless multichannel audio system having a plurality of multichannel speakers, each with a microphone, where the system is capable of receiving audio signals from the multichannel speakers, enhancing any voice signal in the audio signals by canceling at least a portion of any non-voice signal in the audio signals, and processing the voice signal into voice commands, where the non-voice signal is identify in reference to audio streams sent to the speakers via either multicast packets or unicast packets.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:
1. A wireless multichannel audio system:
   having a plurality of multichannel speakers, each with a microphone and a signal processor,
   receiving non-voice reference audio for the plurality of multichannel speakers,
   receiving audio signals from the plurality of multichannel speakers,
   enhancing any voice signal in the audio signals by canceling at least a portion of any non-voice signal in the audio signals, and
   processing the voice signal into voice commands.
2. System in claim 1 where the non-voice reference audio is identified in audio streams sent to the speakers by wireless multicast packets.
3. System in claim 1 where audio streams sent to the plurality of multichannel speakers are wireless Unicast packets.
4. System in claim 1 where the non-voice reference audio is identified in audio streams sent to the plurality of multichannel speakers by wireless multicast packets.
5. System in claim 1 where the non-voice reference audio is identified in audio streams sent to the plurality of multichannel speakers by wireless groupcast packets.

* * * * *